(12) United States Patent
De Castro et al.

(10) Patent No.: US 10,236,783 B1
(45) Date of Patent: Mar. 19, 2019

(54) SELF-DRIVING CONTROL CIRCUIT FOR POWER SWITCHES AS SYNCHRONOUS RECTIFIER

(71) Applicant: Appleton Grp LLC, Rosemont, IL (US)

(72) Inventors: Roderick Perez De Castro, Batangas (PH); Leon Dela Cruz Placido, Jr., Rizal (PH); Mark Chester Bernardino Nepomuceno, Rizal (PH)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 15/873,372

(22) Filed: Jan. 17, 2018

(51) Int. Cl.
| | |
|---|---|
| H02M 3/335 | (2006.01) |
| H02M 7/217 | (2006.01) |
| H02M 1/08 | (2006.01) |
| H02M 1/00 | (2006.01) |
| H02M 3/158 | (2006.01) |

(52) U.S. Cl.
CPC ......... *H02M 3/33592* (2013.01); *H02M 1/08* (2013.01); *H02M 7/217* (2013.01); *H02M 3/158* (2013.01); *H02M 3/1588* (2013.01); *H02M 2001/0054* (2013.01)

(58) Field of Classification Search
CPC ...... H02M 3/158; H02M 3/1588; H02M 1/08; H02M 7/217; H02M 3/33592; H02M 2001/0054
See application file for complete search history.

(56) References Cited

U.S. PATENT DOCUMENTS

| | | | |
|---|---|---|---|
| RE36,571 E | 2/2000 | Rozman | |
| 6,060,943 A | * 5/2000 | Jansen | H03K 17/063 327/493 |
| 6,377,477 B1 | 4/2002 | Xie et al. | |

(Continued)

FOREIGN PATENT DOCUMENTS

| | | |
|---|---|---|
| CN | 1144345 A | 3/2004 |
| CN | 1177402 C | 11/2004 |

(Continued)

OTHER PUBLICATIONS http://www.st.com/en/power-management/synchronous-rectification-controllers.html?querycriteria=productId=SC357, pp. 1-2.

(Continued)

*Primary Examiner* — Kyle J Moody
(74) *Attorney, Agent, or Firm* — McDonnell Boehnen Hulbert & Berghoff LLP

(57) ABSTRACT

A control circuit that is applicable to power supply systems that use synchronous rectification techniques is described. The control circuit provides a self-driven method of control to an active switch by sensing the current flow over the switch. The control circuit includes a diode, a MOSFET, and a BJT. The control circuit may include a first resistor and a second resistor that are both connected to a voltage source. An anode side of the diode is connected to the first resistor while a cathode side of the diode is connected to a drain of the MOSFET. The second resistor is connected to a collector of the BJT as well as a gate of the MOSFET. A base of the BJT is connected to the first resistor and the anode side of the diode. An emitter of the BJT is coupled to a source of the MOSFET.

10 Claims, 8 Drawing Sheets

(56) References Cited

U.S. PATENT DOCUMENTS

| | | | |
|---|---|---|---|
| 6,469,564 B1 * | 10/2002 | Jansen | G06G 7/62 327/365 |
| 6,563,719 B1 | 5/2003 | Hua et al. | |
| 6,583,993 B2 | 6/2003 | Hua | |
| 6,678,172 B1 | 1/2004 | Zhang et al. | |
| 6,839,246 B1 | 1/2005 | Zhang et al. | |
| 8,207,779 B2 * | 6/2012 | Hu | H03K 17/145 327/108 |
| 8,488,355 B2 * | 7/2013 | Berghegger | H02M 3/33592 363/127 |
| 9,219,416 B2 * | 12/2015 | Seok | H02M 3/1588 |
| 9,621,020 B2 * | 4/2017 | Hu | H02M 1/08 |
| 2008/0030263 A1 * | 2/2008 | Frederick | H02J 1/10 327/541 |
| 2013/0076406 A1 * | 3/2013 | Xu | H02M 1/08 327/109 |

FOREIGN PATENT DOCUMENTS

| | | |
|---|---|---|
| CN | 1228909 C | 11/2005 |
| CN | 100405724 C | 7/2008 |
| CN | 100474749 C | 4/2009 |

OTHER PUBLICATIONS http://www.infineon.com/cms/en/product/power/ac-dc-power-conversion/ac-dc-pwm-pfc-controller/synchronous-rectification-ics/, pp. 1-13.

* cited by examiner

SELF-DRIVING CONTROL CIRCUIT FOR POWER SWITCHES AS SYNCHRONOUS RECTIFIER

BACKGROUND OF THE INVENTION

The present invention relates to a control circuit that is applicable to power supply systems that use synchronous rectification techniques. The control circuit provides a self-driven method of control to an active switch by sensing the current flow over the switch. The active switch is a metal-oxide-semiconductor field-effect transistor (MOSFET). As disclosed, current is sensed first in the MOSFET's body diode for a very brief amount of time and then afterward the current is sensed in the MOSFET's on-state resistance. The switching action of the control circuit allows only one direction of current flow through the MOSFET, which, in turn, effectively synchronizes the active switch's turn-on with the conduction of the desired current direction.

Synchronous rectification is a method for improving efficiency of rectification by replacing a diode with an actively controlled switch, such as a MOSFET. This is especially applicable in high-current applications. A benefit from the use of a MOSFET as the switch is that the on-state resistance of a MOSFET has a very low resistance value that provides a low voltage drop when compared to a Schottky diode alone (which, e.g., typically has a 0.3 V or higher voltage drop). The lower voltage drop results in a lower power dissipation in each cycle, an increase in efficiency, as well as a reduction in size and cost due to the elimination of additional components including potentially bulky heat sinks required to cool the diode down.

However, in order to be able to use a MOSFET as a synchronous rectifier, voltage or current sensing is necessary. Because a MOSFET can conduct current in either direction, the timing of the turn-on and turn-off is significant in order to conduct current in the desired direction. Improper switching response may cause further losses that could limit or eliminate any benefit of replacing a diode rectifier with the MOSFET switch. Moreover, improper switching response may cause undesirable cross-conduction between a main switch and the synchronous rectifier resulting in potentially damaging shoot-through currents along a power supply. To maximize converter performance, the timing of the gate drive signal should be correct.

Some conventional synchronous rectifier controllers for driving synchronous rectifiers exist, however, such controllers typically are included within an integrated circuit with other features and functionality that limit the efficiency of the controller alone. Further, such controllers may be overly complex. As such, existing controllers are relatively expensive and not easily adaptable to a variation of uses. Beneficially, the control circuit disclosed herein includes a minimal number of components which makes the controller cost less to manufacture and more available. Further, by designing a simpler circuit for the purpose of driving a power MOSFET used as a synchronous rectifier at the correct timing by sensing the current flow at the MOSFET's on-state resistance, the disclosed controller is easier to implement in a wider array of uses than conventional designs.

SUMMARY

An example control circuit for synchronous rectification, as disclosed herein, senses current flowing in a MOSFET through a BJT, diode, and resistor network connected across the drain and the source of the MOSFET.

In one aspect, the disclosure is directed to a control circuit. The control circuit includes a diode, a metal-oxide-semiconductor field-effect transistor (MOSFET), and a bipolar junction transistor (BJT). Furthermore, the control circuit may include a first resistor and a second resistor that are both connected to a power supply or voltage source. An anode side of the diode is connected to the first resistor while a cathode side of the diode is connected to a drain of the MOSFET. The second resistor is connected to a collector of the BJT as well as to a gate of the MOSFET. Moreover, a base of the BJT is connected to the first resistor and the anode side of the diode. An emitter of the BJT is coupled to a source of the MOSFET. Within examples, the control circuit may further include a totem pole gate drive circuit can be added to increase the driving capability. In other examples, additional components such as a baker clamp (e.g., a Schottky diode over the base-collector of the BJT) are considered.

In another aspect, a method is described. The method includes increasing a voltage on a source of a MOSFET relative to a drain of the MOSFET by a current first passing through a body diode of the MOSFET and then passing through the MOSFET on-state resistance second. Additionally, the method includes reducing voltage from a forward voltage of a diode and the MOSFET on-state resistance. A cathode side of the diode is connected to the drain of the MOSFET. The method also includes allowing current to flow through the diode but not through the BJT when a difference between the forward voltage of the diode and the voltage of the source relative the drain of the MOSFET is less than a base-emitter voltage of a BJT. A base of the BJT is connected to an anode side of the diode while an emitter of the BJT is connected to the source of the MOSFET. A collector of the BJT is connected to a gate of the MOSFET. The method further includes allowing current to flow through the BJT but not the diode when a sum of the forward voltage of the diode and the voltage of the source relative the drain of the MOSFET is greater than or equal to the base-emitter voltage.

These, as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

As introduced above, an example control circuit, as disclosed herein, senses current flowing in a MOSFET through a BJT, diode, and resistor network connected across the drain and the source of the MOSFET. The source of the MOSFET is grounded in order to be driven easier.

Figure 1:
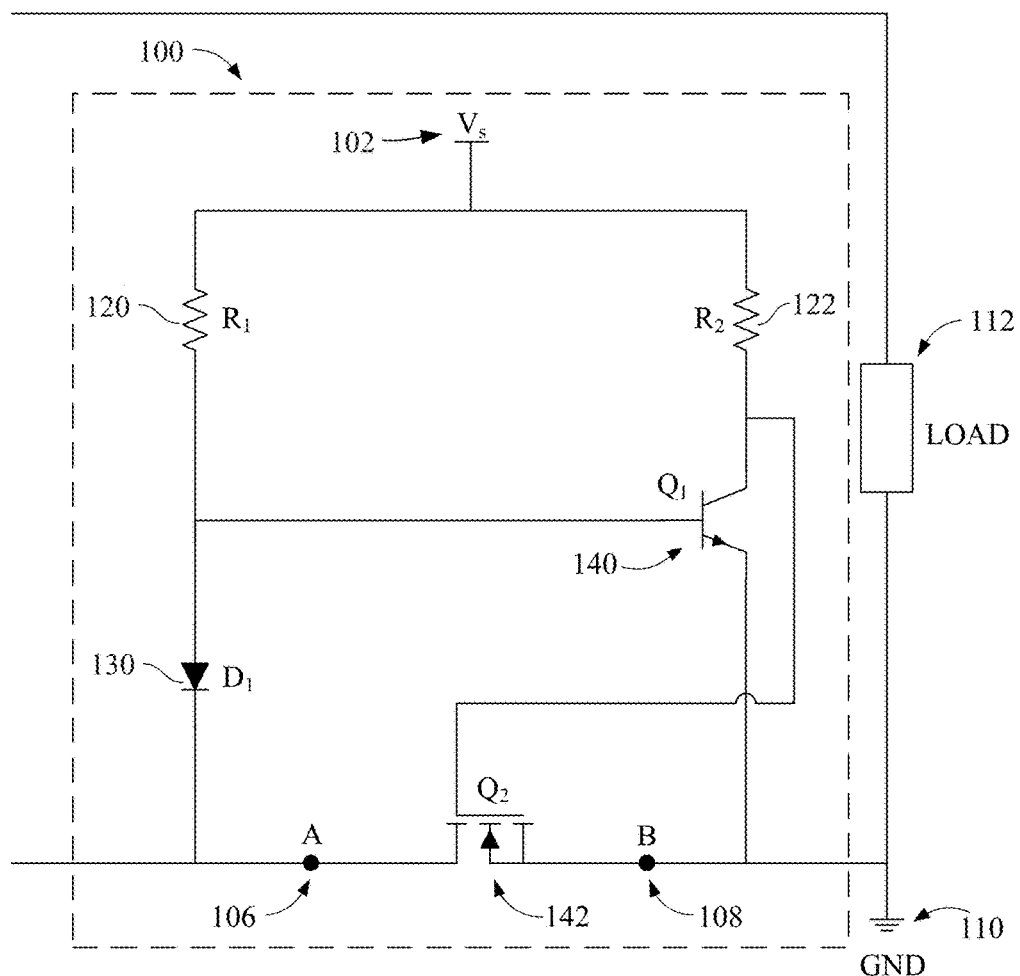
FIG. 1 depicts a simplified circuit diagram of a control circuit for synchronous rectification, according to an example implementation.

FIG. 1 illustrates a control circuit 100 for synchronous rectification. The control circuit 100 includes a voltage source ($V_S$) 102, ground 110, a load 112, a first resistor ($R_1$) 120, a second resistor ($R_2$) 122, a diode ($D_1$) 130, a bipolar junction transistor (BJT) ($Q_1$) 140, and a metal-oxide-semiconductor field-effect transistor (MOSFET) ($Q_2$) 142.

As illustrated in FIG. 1, the first resistor 120 and the second resistor 122 may be coupled to the voltage source 102. The first resistor 120 may also be coupled to a base of the BJT 140 and an anode side of the diode 130. The second resistor 122 may be coupled to a collector of the BJT 140. A gate of the MOSFET 142 may be connected to the collector of the BJT 140 and the second resistor 122 while a drain of the MOSFET 142 is connected to a cathode side of the diode 130. A source of the MOSFET 142 may also be coupled to an emitter of the BJT 140. Also, the source of the MOSFET 142 may be coupled to ground 110 so that the source can be driven easier.

The BJT 140 and the diode 130 may be switching depending on a direction of current flowing through the MOSFET 142. In other words, a switching action of the control circuit 100 allows current to flow through the MOSFET 142 in a single direction (as provided in further detail herein). Within examples, the BJT 140 is an NPN transistor. Moreover, in order to prevent pre-mature turn-off of the switch, the BJT 142 may be biased such that a base-emitter forward voltage ($V_{BEQ1}$) is greater than an on-threshold voltage of diode 130.

Figure 2:
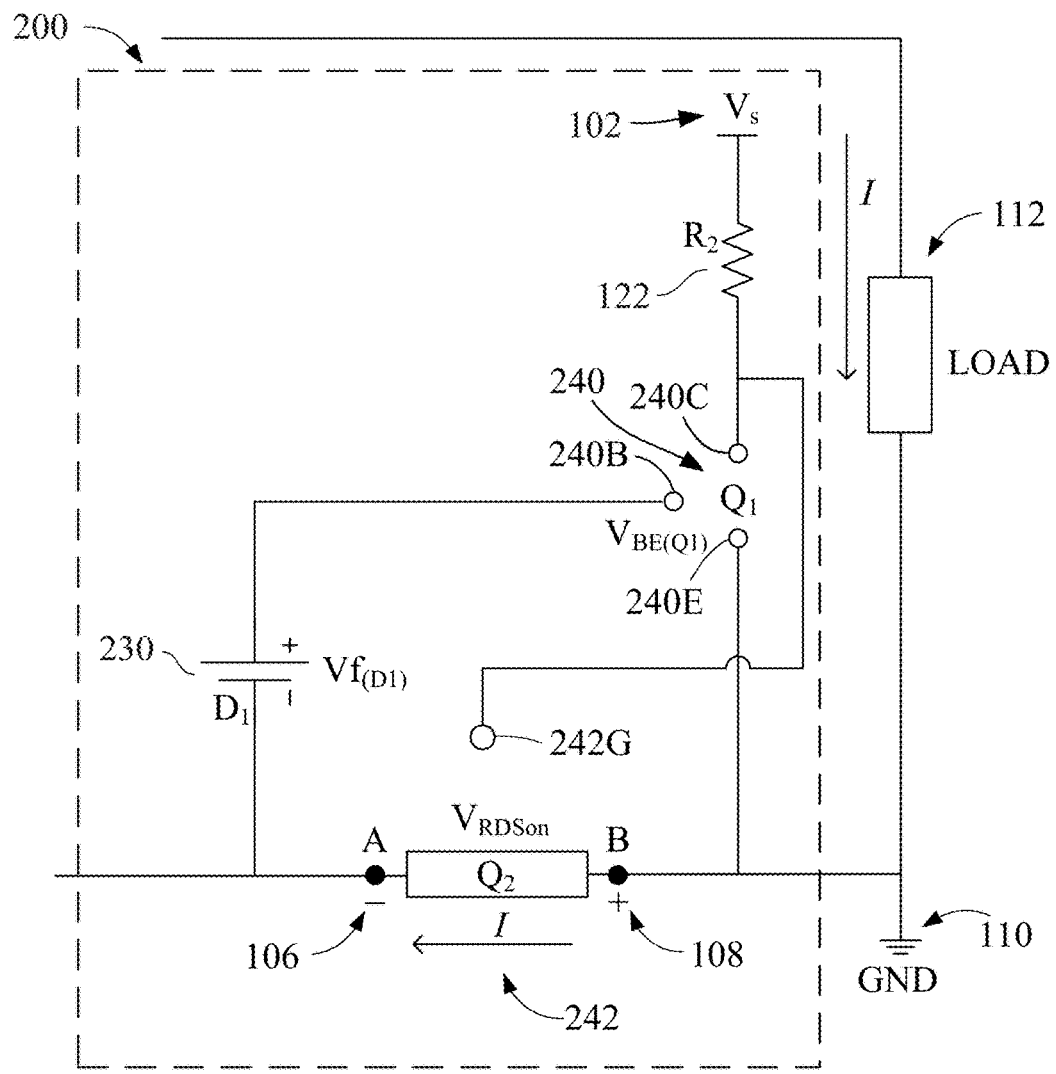
FIG. 2 depicts a simplified circuit diagram of a control circuit for synchronous rectification in a first state, according to an example implementation.
Figure 3:
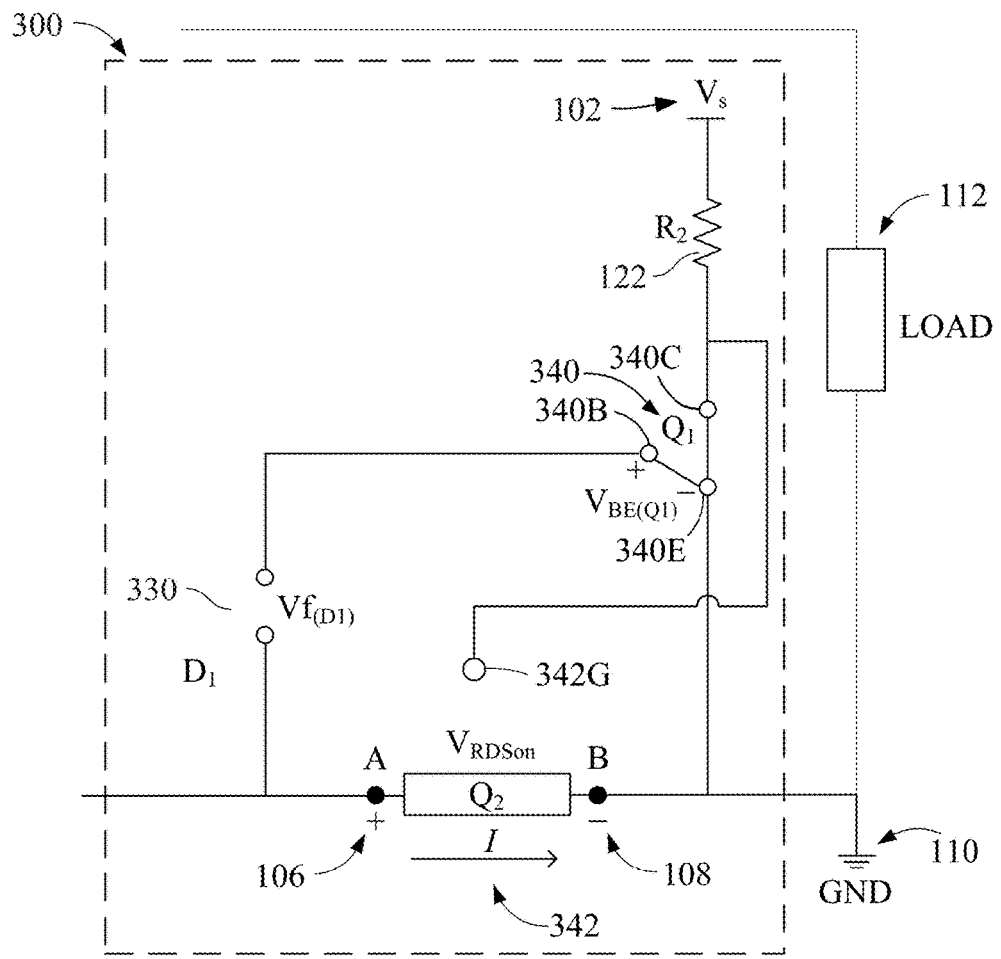
FIG. 3 depicts a simplified circuit diagram of a control circuit for synchronous rectification in a second state, according to an example implementation.

FIG. 2 illustrates a control circuit 200 in a first state, while FIG. 3 illustrates a control circuit 300 in a second state. FIG. 2 and FIG. 3 may represent a simplified version of FIG. 1 in order to more easily represent the first and the second states of the control circuit 100. The first state and the second state of FIGS. 2 and 3 may be similar in form with similar components to one another (and FIG. 1), but with different functions based on unique state characteristics of each described in more detail below. In some aspects, the first state and second state of FIGS. 2 and 3 respectively may depict the switch of a MOSFET as part of a control circuit, such as control circuit 100 of FIG. 1, for synchronous rectification as described herein.

The control circuit 200 of FIG. 2 and the control circuit 300 of FIG. 3 may each be similar in form as the control circuit 100 of FIG. 1. Furthermore, components of the control circuit 200 and the control circuit 300 may be similar to components described within the control circuit 100. Similar reference characters may be used between FIG. 1, FIG. 2, and FIG. 3 for similar components, and variations of reference characters may be used to more particularly describe a certain features or components of FIG. 2 or FIG. 3. However, while variations of reference characters may be used, physical aspects of components described in FIG. 1, FIG. 2, and FIG. 3 may nonetheless be similar in form and/or function.

The first state, as depicted in FIG. 2, may be considered a "high" state or condition. As shown in FIG. 2, the control circuit 200 includes the voltage source ($V_S$) 102, ground 110, the load 112, the second resistor ($R_2$) 122, a diode ($D_1$) 230, a BJT ($Q_1$) 240, a base 240B of the BJT 240, a collector 240C of the BJT 240, an emitter 240E of the BJT 240, a MOSFET ($Q_2$) 242, and a gate 242G of the MOSFET 242. As described, the BJT 240, the diode 230, and the MOSFET 242 may be similar to the BJT 140, the diode 130, and the MOSFET 142 within FIG. 1, however the BJT 240, the diode 230, and the MOSFET 242 are indicated differently in order to more particularly describe various voltage conditions as described herein.

Similarly, as depicted in FIG. 3, the control circuit 300 includes the voltage source ($V_S$) 102, ground 110, the load 112 the second resistor ($R_2$) 122, a diode ($D_1$) 330, a BJT ($Q_1$) 340, a base 340B of the BJT 340, a collector 340C of the BJT 340, an emitter 340E of the BJT 340, a MOSFET ($Q_2$) 342, and a gate 342G of the MOSFET 342. As described, the BJT 340, the diode 330, and the MOSFET 342 may be similar to the BJT 140, the diode 130, and the MOSFET 142 within FIG. 1 (and/or the corresponding components in FIG. 2), however the BJT 340, the diode 330, and the MOSFET 342 are indicated differently in order to more particularly describe various voltage conditions as described herein.

In FIG. 2, the high state, no current flows through BJT 240. Initially, current passes through a body diode of the MOSFET 242. Current will only flow in this direction for a very short amount of time, e.g., 100 nanoseconds. During that time, the described current flow will introduce a more positive potential at location point B 108 on a source side of the MOSFET 242. The potential across location point A 106 (on a drain side of the MOSFET 242) and location point B 108, i.e., the potential across the drain-source of the MOSFET 242 ($V_{RDSon}$), will subtract from a forward voltage ($Vf_{(D1)}$) of the diode 230. When the difference between $Vf_{(D1)}$ and $V_{RDSon}$ is less than a base-emitter voltage ($V_{BE(Q1)}$) of BJT 240 (i.e., $Vf_{(D1)} - V_{RDSon} < V_{BE(Q1)}$), then BJT 240 is in a turn-off state that results in the "high" state depicted in FIG. 2. As the MOSFET 242 turns on, the current will immediately pass through the on-state resistance which is a low impedance path. The conduction of current will continue until it reaches zero level.

Continuing on to FIG. 3, the second state may be considered a "low" state or condition. When the current has zero magnitude or reverses direction, there will now be a more positive potential at location point A (the drain side of MOSFET 342). Now, the potential across location point A and location point B (i.e., $V_{RDSon}$) will add up to the forward voltage ($Vf_{D1}$) of the diode 330. As such, when a sum of $Vf_{(D1)}$ and $V_{RDSon}$ is greater than or equal to the base-emitter voltage ($V_{BE(Q1)}$) of BJT 340 (i.e., $Vf_{(D1)}+V_{RDSon} \geq V_{BE(Q1)}$), then diode 330 is reverse biased, (i.e., no current will flow through the diode 230) and the BJT 340 is biased, thus allowing current flow from the collector 340C to the emitter 340E. Therefore, the bias at a gate of the MOSFET 342 is removed and additional current flow is prevented. As illustrated in FIGS. 2 and 3, the BJT and the diode may switch based on a direction of current flow through the MOSFET. The switching action of the control circuit allows one direction of current flow through the MOSFET, which, in turn, effectively synchronizes the active switch's turn-on with the conduction of the desired current direction.

Figure 4:
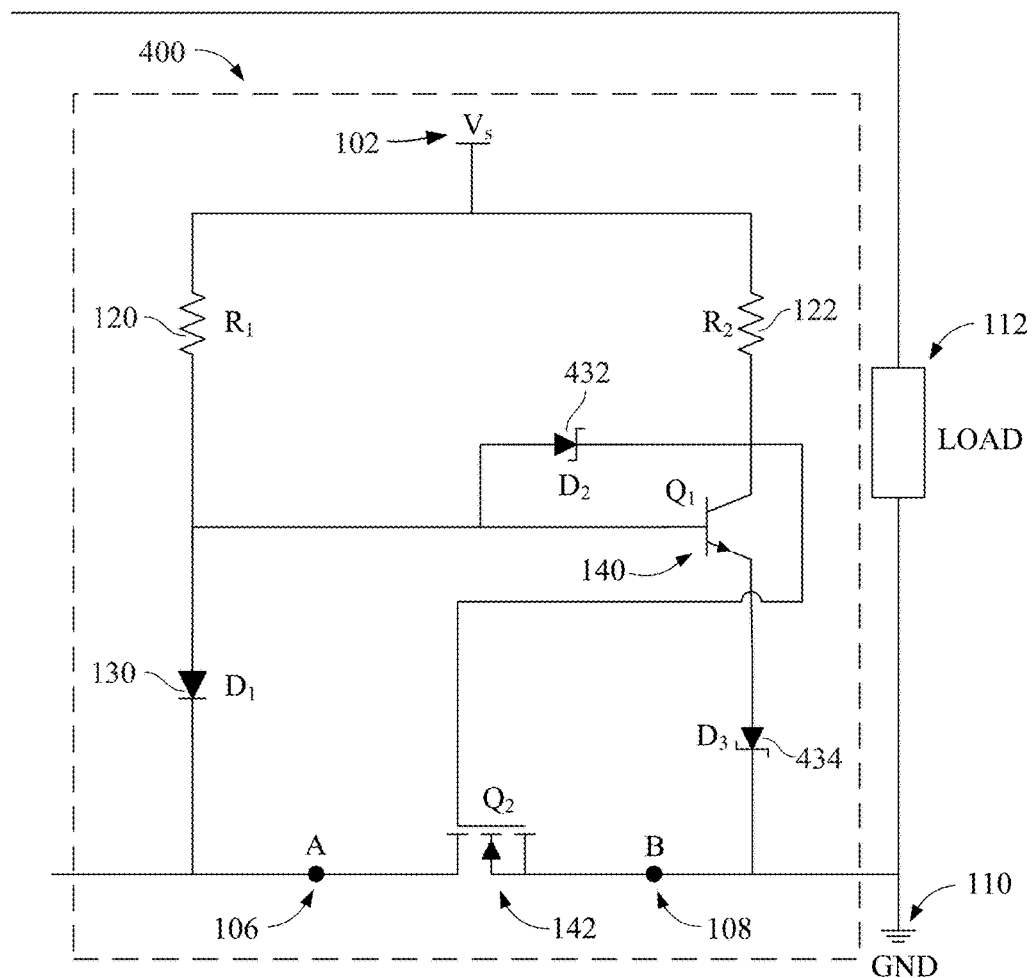
FIG. 4 depicts a simplified circuit diagram of a control circuit for synchronous rectification, according to an example implementation.

Moving to FIG. 4, FIG. 4 illustrates another embodiment of a control circuit 400. The control circuit 400 may be similar and include all the components of the control circuit 100 of FIG. 1 and be able to operate as described in the control circuit 200 and the control circuit 300 of FIGS. 2 and 3, respectively. Additionally, the control circuit 400 may include one or more additional components. As illustrated, the control circuit 400 of FIG. 4 also includes a first Schottky diode ($D_2$) 432 and a second Schottky diode ($D_3$) 434. While both the first Schottky diode 432 and a second Schottky diode 434 are depicted in FIG. 4, it is well-considered that both may not be required and one of the components may be included and operate exclusively from whether or not the other component has also been included within a particular embodiment.

The first Schottky diode 432 may be located in the control circuit 400 such that an anode side of the first Schottky diode 432 may be connected to the first resistor 120, the base of the BJT 140, and the anode side of the diode 130. Further, a cathode side of the first Schottky diode 432 may be connected to the second resistor 122, the collector of the BJT 140, and to the gate of the MOSFET 142. In other words, the first Schottky diode 432 may be installed across the base-collector of the BJT 140 (i.e., a baker clamp). The addition of the first Schottky diode 432 may improve the switching response of the gate drive circuit.

In another example, the control circuit 400 may also include the second Schottky diode 434. An anode side of the second Schottky diode 434 may be coupled to the emitter of the BJT 140. A cathode side of the second Schottky diode 434 may be coupled to source of the MOSFET 142. In other words, the second Schottky diode 434 may be installed between the BJT 140 and the MOSFET 142. The addition of the second Schottky diode 434 may add threshold voltage to the circuit 400 in order to bias the BJT 140 such that the base-emitter forward voltage of the BJT 140 is higher than the on-threshold of the diode 130 (as described above).

Within embodiments, the control circuits described may be implemented as a method. In one example, a method may include increasing a voltage on a source of a MOSFET relative to a drain of the MOSFET (i.e., $V_{RDSon}$) by a current passing through a body diode of the MOSFET. The method may also include reducing a forward voltage of a diode ($V_{f\_D}$). In such an example, a cathode side of the diode may be connected to the drain of the MOSFET. Moreover, the method may include some conditions. For example, when a difference between the $V_{f\_D}$ and the $V_{RDSon}$ is less than a base-emitter voltage ($V_{BE\_BJT}$) of a bipolar junction transistor (BJT), current may not flow through the BJT but current may flow through the diode. A base of the BJT may be connected to an anode side of the diode in such an example. The method may also include allowing the current to flow through the BJT not allowing current through the diode when a sum of the $V_{f\_D}$ and the $V_{RDSon}$ is greater than or equal to the $V_{BE\_BJT}$.

Figure 5:
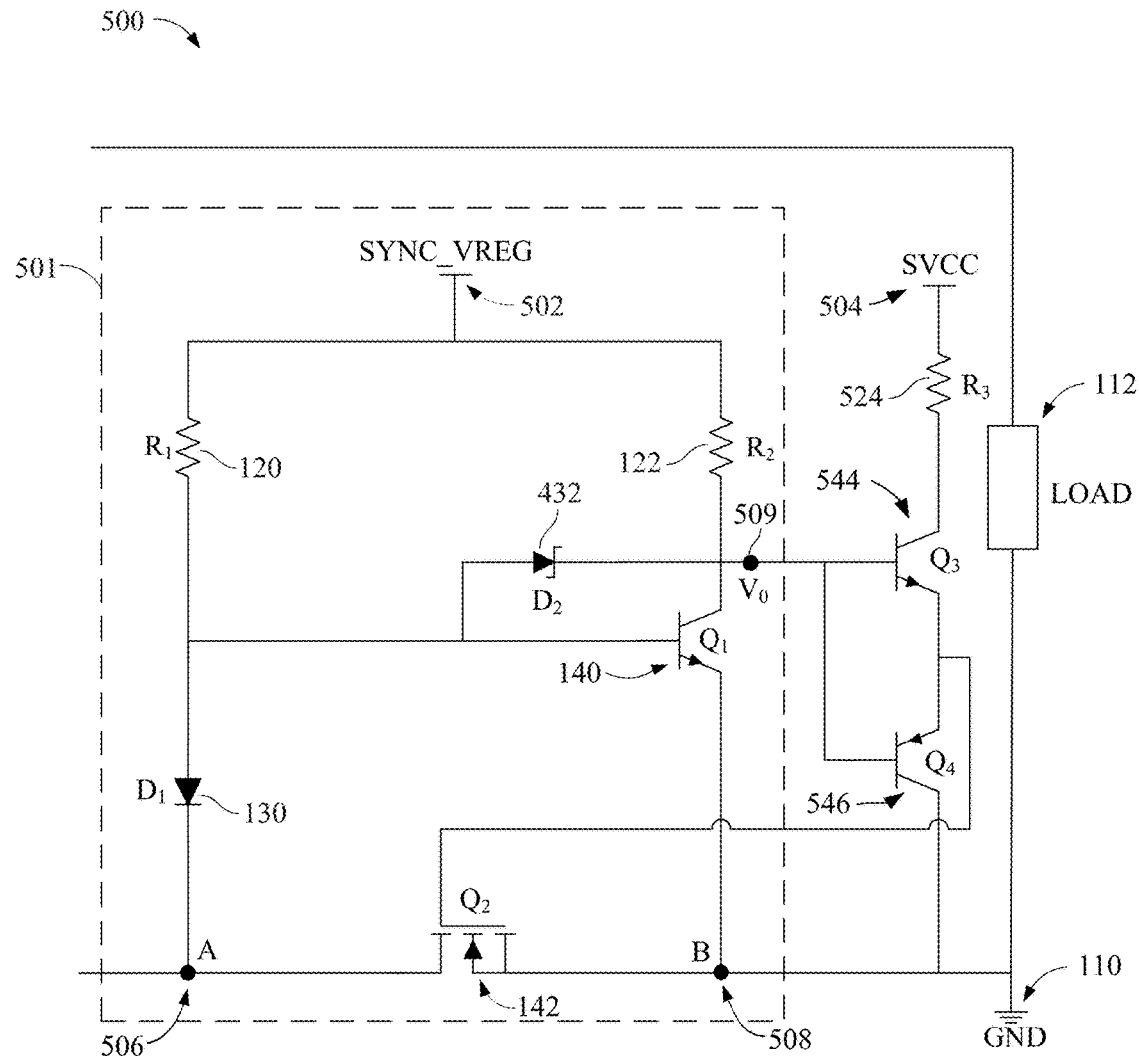
FIG. 5 depicts a simplified circuit diagram of a control circuit for synchronous rectification in a testing configuration, according to an example implementation.

Testing was conducted using an exemplary control circuit for synchronous rectification as described above. FIG. 5 illustrates a simplified circuit diagram of a control circuit 501 for synchronous rectification in a testing configuration, while FIGS. 6-9 provide results of the steps taken during the described testing.

FIG. 5 illustrates a schematic of a circuit 500 that was designed to test the control circuit 501 for synchronous rectification. The control circuit 501 may be similar in form and function to the control circuits and components therein previously described. Moreover, the control circuit 501 may include components described in any of the similar control circuits described herein. In addition to components previously described, the circuit 500 also includes a voltage source (SYNC_VREG) 502, another voltage source (SVCC) 504, ground 512, a third resistor ($R_3$) 524, a second BJT ($Q_3$) 544, and a third BJT ($Q_4$) 546.

As tested, the control circuit 501 was applied to a DC-DC flyback section's secondary side. Descriptions for the various components used in the testing circuit 500 included:

| Component Name | Component Description |
| --- | --- |
| First resistor ($R_1$) 120 | 14K |
| Second resistor ($R_2$) 122 | 2K2 |
| Third resistor ($R_3$) 524 | 17R |
| Diode ($D_1$) 130 | BAS21 |
| Schottky diode ($D_2$) 432 | BAS70 |
| BJT ($Q_1$) 140 | BCX56 |
| MOSFET ($Q_2$) 142 | Q513 |
| BJT ($Q_3$) 544 | BCX56 |
| BJT ($Q_4$) 546 | BCX53 |

The control circuit 501 was first assembled on a separate external PCB. First, location point A 506 was connected to the drain of MOSFET 142 and location point B 508 was connected to the source of MOSFET 142 for sensing. Second, the first resistor 120 and the second resistor 122 were connected to the voltage supply 502. The point $V_0$ 509 was not terminated while the signal synchronicity was tested with the secondary current.

Figure 6:
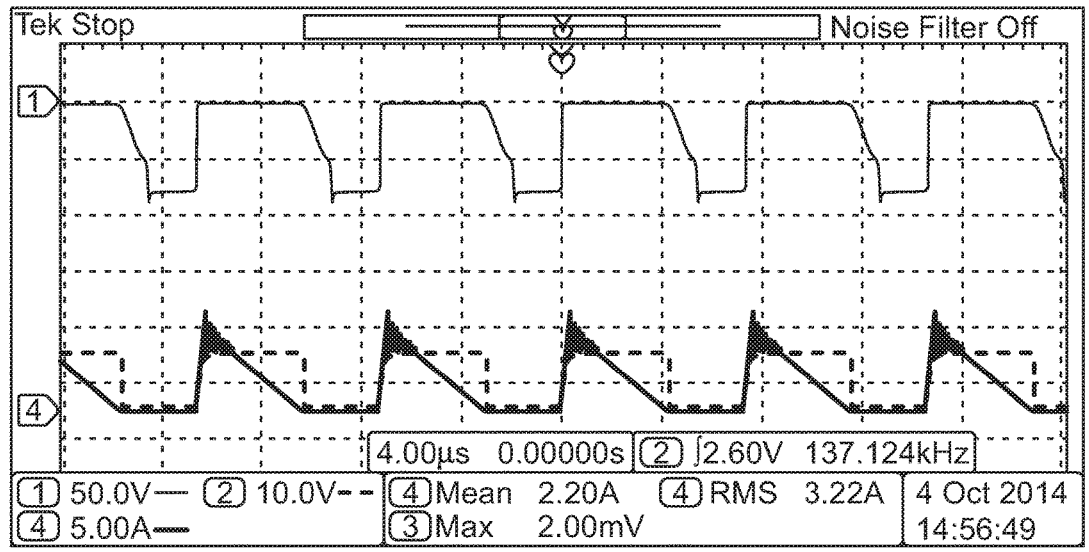
FIG. 6 provides initial waveforms in preparation for testing of a control circuit for synchronous rectification, according to an example implementation.
Figure 7:
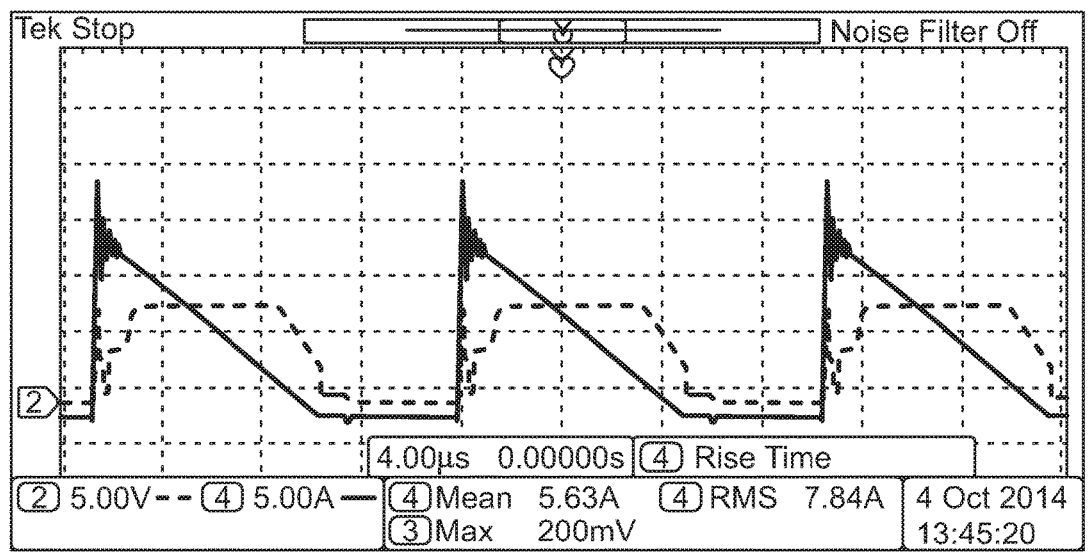
FIG. 7 provides a circuit's synchronous rectifier gate signal and its drain current waveforms in preparation for testing of a control circuit for synchronous rectification, according to an example implementation.

FIGS. 6-9 are each described below as steps were taken during the testing. In general, FIGS. 6 and 7 are an original circuit before connected the control circuit 501 for testing in order to establish some baselines. FIG. 6 provides initial waveforms while checking synchronicity and determining component values. As shown in FIG. 6, Ch. 1 is the voltage across diode 130 to check voltage stress and the state of the diode 130. Ch.2 is voltage at point $V_0$ 509 to check sync with secondary current. Ch.4 is the flyback secondary current.

Continuing to FIG. 7, FIG. 7 provides the circuit's original synchronous rectifier gate signal and its drain current waveforms. Ch.2 is the voltage at the gate of the MOSFET 142. Ch.4 is remains the flyback secondary current.

At this point, the circuit 500 is still using an original synchronous rectifier controller and its signal is used as reference while optimizing the values and components of the test circuit 500. If there is no controller present, a MOSFET's body diode can be used provided that the gate is grounded to prevent unwanted biasing to keep the converter working and get a secondary current reference.

When synchronicity between point $V_0$ 509 and the secondary current is achieved and the values of components are determined, the original circuit is removed and replaced by the control circuit 501. Point V$_O$ 509 is now connected to the totem pole gate driver. Additional steps for further checking and adjustments are completed to optimize the gate signal.

Figure 8:
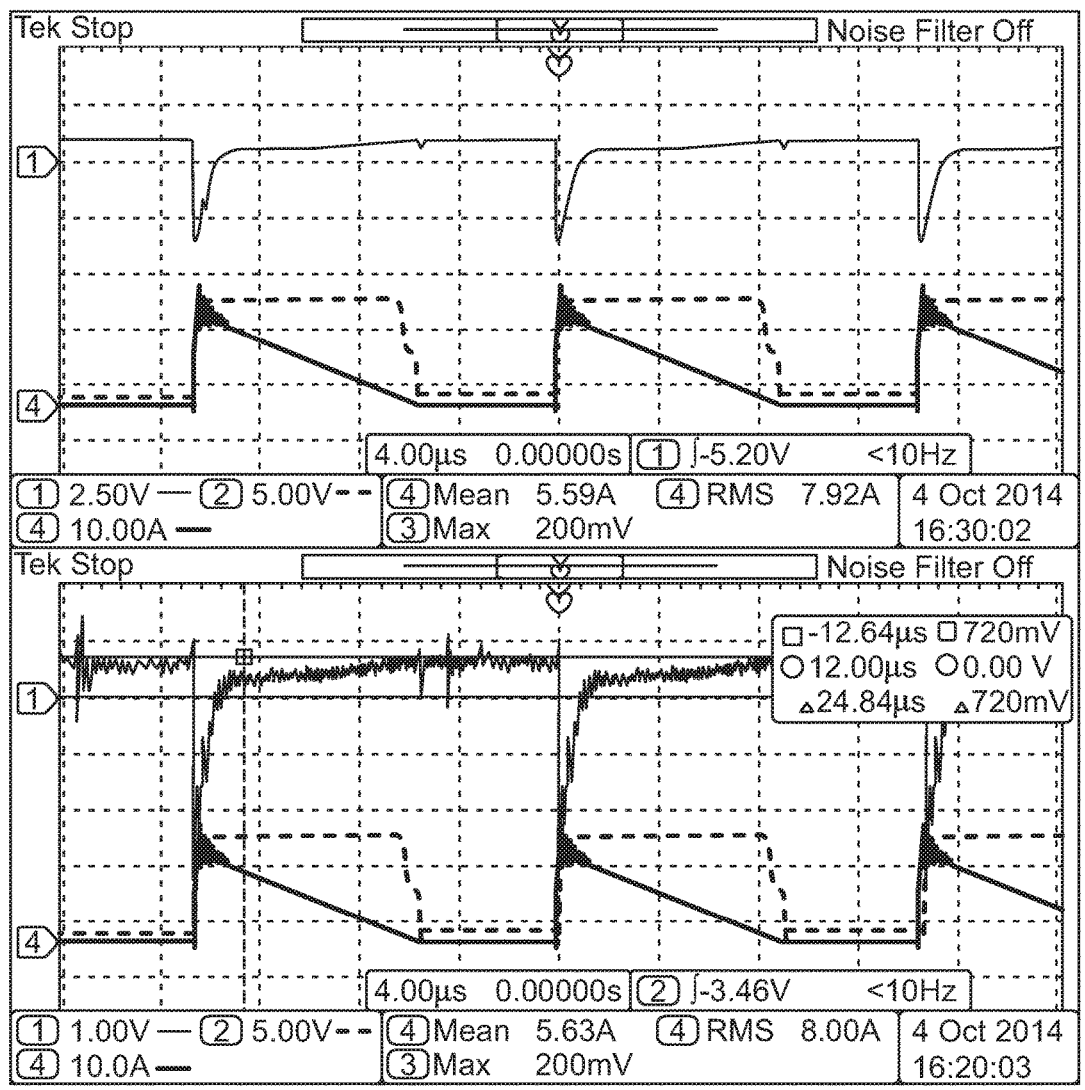
FIG. 8 provides initial testing waveforms after connecting a control circuit for synchronous rectification, according to an example implementation.

Continuing to FIG. 8, FIG. 8 provides initial waveforms after connecting the proposed circuit's point V$_O$ to the totem pole driver. Ch. 1 is the voltage across base-emitter of BJT 140 to check voltage stress and the state of BJT 140. Ch.2 is the voltage at point V$_O$ 509 to check sync with the secondary current. Ch.4 is the flyback secondary current.

Figure 9:
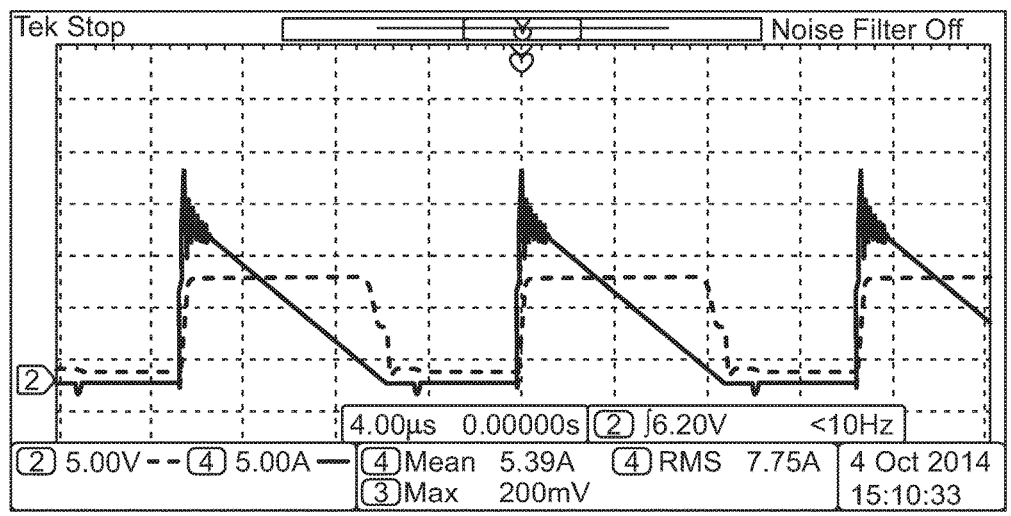
FIG. 9 provides the final testing waveforms after connecting a control circuit for synchronous rectification, according to an example implementation.

FIG. 9 provides the final test waveforms: the gate signal of the test circuit 501 when applied to the original synchronous rectifier after optimization. FIG. 9 indicates the proper synchronization between the gate signal and the conduction of the secondary current. Ch.2 is the voltage at the MOSFET 142. Ch.4 is the flyback secondary current.

As such, and after performing the initial test, it was determined that the proposed control circuit 501 can effectively provide self-driven type of control to a power switch utilized as a synchronous rectifier.

CONCLUSION

The present disclosure is not to be limited in terms of the particular implementations described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example implementations described herein and in the figures are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A control circuit, comprising:
   a voltage source;
   a first resistor coupled to the voltage source;
   a second resistor coupled to the voltage source;
   a diode, wherein an anode side of the diode is coupled to the first resistor;
   a metal-oxide-semiconductor field-effect transistor (MOSFET), wherein a drain of the MOSFET is coupled to a cathode side of the diode, a gate of the MOSFET is coupled to the second resistor;
   a bipolar junction transistor (BJT), wherein a collector of the BJT is coupled to the second resistor and to the gate of the MOSFET, a base of the BJT is coupled to the first resistor and the anode side of the diode, and an emitter of the BJT is coupled to a source of the MOSFET; and
   a Schottky diode, wherein an anode side of the Schottky diode is coupled to the first resistor, the base of the BJT, and the anode side of the diode, and further wherein a cathode side of the Schottky diode is coupled to the second resistor, the collector of the BJT, and the gate of the MOSFET.

2. The control circuit of claim 1, wherein the BJT is an NPN transistor.

3. The control circuit of claim 1, wherein a base-emitter voltage of the BJT is greater than an on-threshold of the diode.

4. The control circuit of claim 1, further comprising:
   a second Schottky diode, wherein an anode side of the second Schottky diode is coupled to the emitter of the BJT, and further wherein a cathode side of the second Schottky diode is coupled to the source of the MOSFET.

5. The control circuit of claim 1, wherein a switching action of the control circuit allows current to flow through the MOSFET in a single direction.

6. The control circuit of claim 1, wherein the MOSFET is a switch, further wherein the switch's turn-on is synchronized with a conduction of a current direction.

7. The control circuit of claim 1, wherein the BJT and the diode switch based on a direction of current flow through the MOSFET.

8. A method, comprising:
   increasing a voltage on a source of a metal-oxide-semiconductor field-effect transistor (MOSFET) relative to a drain of the MOSFET by a current first passing through a body diode of the MOSFET for less than 100 nanoseconds and then second through a MOSFET on-state resistance ($V_{RDSon}$);
   reducing voltage from a forward voltage of a diode ($V_{f\_D}$) and the $V_{RDSon}$, wherein a cathode side of the diode is coupled to the drain of the MOSFET;
   when a difference between the $V_{f\_D}$ and the $V_{RDSon}$ is less than a base-emitter voltage ($V_{BE\_BJT}$) of a bipolar junction transistor (BJT), wherein a base of the BJT is coupled to an anode side of the diode and a collector of the BJT is connected to a gate of the MOSFET, not allowing current flow through the BJT and allowing current to flow through the diode; and
   when a sum of the $V_{f\_D}$ and the $V_{RDSon}$ is greater than or equal to $V_{BE\_BJT}$, allowing current flow through the BJT and not allowing current to flow through the diode.

9. The method of claim 8, further comprising coupling a Schottky diode across the base of the BJT and a collector of the BJT.

10. The method of claim 8, further comprising increasing an on-threshold of the diode by coupling an anode side of a Schottky diode to the emitter of the BJT and a cathode side of the Schottky diode to the source of the MOSFET.

* * * * *